United States Patent
Gu et al.

(10) Patent No.: US 10,261,635 B2
(45) Date of Patent: Apr. 16, 2019

(54) TOUCH SUBSTRATE, METHOD FOR MANUFACTURING THE SAME, TOUCH SCREEN, AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Xiaofang Gu, Beijing (CN); Ming Hu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 146 days.

(21) Appl. No.: 14/424,787

(22) PCT Filed: May 27, 2014

(86) PCT No.: PCT/CN2014/078507
§ 371 (c)(1),
(2) Date: Feb. 27, 2015

(87) PCT Pub. No.: WO2015/081671
PCT Pub. Date: Jun. 11, 2015

(65) Prior Publication Data
US 2016/0041643 A1 Feb. 11, 2016

(30) Foreign Application Priority Data
Dec. 2, 2013 (CN) .......................... 2013 1 0637724

(51) Int. Cl.
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC ........... G06F 3/044; G06F 2203/04103; G06F 2208/04112
(Continued)

(56) References Cited

U.S. PATENT DOCUMENTS

2010/0123670 A1* 5/2010 Philipp .................. G06F 3/044
345/173
2010/0302201 A1* 12/2010 Ritter ..................... G06F 3/044
345/174
(Continued)

FOREIGN PATENT DOCUMENTS

CN 103049155 A 4/2013
CN 103218097 A 7/2013
(Continued)

OTHER PUBLICATIONS

Office Action dated Dec. 24, 2015 issued in corresponding Chinese Application No. 201310637724.2.
(Continued)

*Primary Examiner* — Mark W Regn
(74) *Attorney, Agent, or Firm* — Nath, Goldberg & Meyer; Joshua B. Goldberg

(57) ABSTRACT

A touch substrate includes a base substrate and at least one driving electrode chain and at least one sensing electrode chain each of which is arranged parallel to each other on the base substrate. Each driving electrode chain includes a plurality of driving electrodes which are connected in series, and each sensing electrode chain includes a plurality of sensing electrodes which are connected in series. The driving electrodes and/or the sensing electrodes are made of a metal conductor, and a plurality of light transmissive regions (Continued)

are provided in each of the driving electrodes and/or the sensing electrodes made of the metal conductor. The touch substrate can be touched and controlled normally and can transmit light normally, while the surface resistance of each of the driving electrodes and/or the sensing electrodes therein is decreased greatly. Thus, the power consumption and production cost of the touch substrate is further decreased.

15 Claims, 3 Drawing Sheets

(58) Field of Classification Search
USPC .......................................................... 345/174
See application file for complete search history.

(56) References Cited

U.S. PATENT DOCUMENTS

2011/0018840 A1    1/2011  Fann et al.

2012/0062486 A1*   3/2012  Rho ........................ G06F 3/041
                                                                         345/173
2014/0168540 A1*   6/2014  Wang ................... G06F 3/0412
                                                                        349/12

FOREIGN PATENT DOCUMENTS

| | | |
|---|---|---|
| CN | 103278955 A | 9/2013 |
| CN | 103293780 A | 9/2013 |
| CN | 203643969 U | 6/2014 |

OTHER PUBLICATIONS

English translation of the Written Opinion of the International Searching Authority submitted with the IDS filed Feb. 27, 2015.

International Search Report for International Application No. PCT/CN2014/078507.

* cited by examiner

TOUCH SUBSTRATE, METHOD FOR MANUFACTURING THE SAME, TOUCH SCREEN, AND DISPLAY DEVICE

This is a National Phase Application filed under 35 U.S.C. 371 as a national stage of PCT/CN2014/078507, filed May 27, 2014, an application claiming the benefit of Chinese Application No. 201310637724.2, filed Dec. 2, 2013, the content of each of which is hereby incorporated by reference in its entirety.

FIELD OF THE INVENTION

The present invention relates to the field of display technology, in particular, relates to a touch substrate, a method for manufacturing the same, a touch screen, and a display device.

BACKGROUND OF THE INVENTION

With the development of the technology of touch screen, different touch technologies have been developed. The touch technologies mainly include the following types in terms of the operating principle thereof: a resistive touch screen, a capacitive touch screen, an infrared touch screen, an electromagnetic touch screen, and a surface acoustic wave touch screen, wherein, the capacitive touch screen has been employed most widely. Capacitive touch screens include a self capacitance touch screen and a mutual capacitance touch screen. As compared to the self capacitance touch screen, the mutual capacitance touch screen has become the mainstream of the existing touch screens for its advantages of high anti-interference performance, high sensitivity, multi-touch, high recognition performance, and the like.

Depending on an integration mode of a touch screen with a display screen in a display device, touch screens mainly include a out-cell touch screen (wherein, for example, a touch screen is attached to a display screen), a on-cell touch screen in which a touch sensor is provided on a liquid crystal panel (i.e., wherein a touch screen is arranged between a color-filter substrate and a polarizer of a display screen), and a in-cell touch screen in which a touch sensor is provided inside a liquid crystal panel (i.e., wherein the function of a touch panel is embedded into a liquid crystal pixel).

With the increasing requirement for a lighter and thinner touch screen in the market, it will become an inevitable trend that a two-layer glass (Sensor Glass+Cover Glass) touch screen is replaced by a one glass solution (OGS) capacitive touch screen. OGS means a single-piece-of-glass solution, and means that a touch layer of a touch screen is formed on a single glass substrate. Wherein, the single glass substrate serves as both a touch substrate and a protection substrate. Whereas, the two-layer glass touch screen uses two pieces of glass, one of which serves is used as a touch substrate on which a touch layer is formed, and the other serves is used as a protection substrate; the protection substrate and the touch substrate are aligned and assembled to protect the touch layer. As compared to the two-layer glass touch screen, the one glass solution capacitive touch screen saves one glass substrate, thus also saves a process for attaching the omitted glass substrate during manufacturing the touch screen, thus the touch screen can be formed thinner with lower cost. Hence, The OGS has become the current mainstream of touch screen technology.

The one glass solution capacitive touch screen is a mutual capacitance touch screen, and its basic operating principle is as follows. There are provided two adjacent conductors and an inherent capacitance therebetween. When another conductor (e.g., a finger) comes close to the two conductors, inductive capacitance will be generated between the another conductor and the two conductors. The inductive capacitance will be connected to the inherent capacitance in parallel, causing the overall capacitance to increase. The overall capacitance will be restored to the inherent capacitance after the finger is removed. The periphery of the touch screen is provided with a drive-control circuit, which detects a change of capacitance with and withouth a finger, so as to determine whether a touch on the touch screen occurs and determine a touch position. Thus, the touch function of the touch screen is completed.

The two conductors generating mutual capacitance in the one glass solution capacitive touch screen are a plurality of driving electrode chains arranged in an X direction of and a plurality of sensing electrode chains arranged in a Y direction, the X direction of being perpendicular to the Y direction. Each of the driving electrode chains and each of the sensing electrode chains are electrically connected to respective drive-control circuits, respectively. The driving electrode chains and the sensing electrode chains cross with each other in spatial positions, and form mutual capacitance (coupling capacitance). When there is a touch by a finger, the mutual capacitance changes. The change of the mutual capacitance is detected by a drive-control circuit, so that the specific touch position is determined.

In a traditional one glass solution capacitive touch screen, both the driving electrode chains and the sensing electrode chains are made of an indium tin oxide (ITO) film. The ITO film is a transparent conductor, which facilitates normal touch on the touch screen while keeping normal display of a display screen. However, since the driving electrode chains and the sensing electrode chains almost cover the whole touch region of the touch screen and the indium tin oxide film has very large surface resistance, the touch screen has very high power consumption. Thus, the indium tin oxide film is not suitable for touch and control of a large-size screen. In addition, since the indium tin oxide film is used as transparent electrodes of most display devices, resources thereof are relatively short and the price thereof is increased with time goes on, which is not helpful to reduce the manufacturing cost of a touch screen or even a display screen.

SUMMARY OF THE INVENTION

In view of the above technical problems existing in the prior art, the present invention provides a touch substrate, a method for manufacturing the same, a touch screen, and a display device. In the touch substrate, by forming the driving electrodes and/or the sensing electrodes with a metal conductor, and providing a light transmissive region in each of the driving electrodes and/or the sensing electrodes made of metal conductor, not only the touch substrate can be touched and controlled normally and can transmit light normally, but also surface resistance of each of the driving electrodes and/or the sensing electrodes in the touch substrate is decreased greatly. Thus, the power consumption and production cost of the touch substrate is further decreased.

The present invention provides a touch substrate, including:

a base substrate;

at least one driving electrode chain, which is arranged parallel to each other on the base substrate, each of the at least one driving electrode chain includes a plurality of driving electrodes which are connected in series;

at least one sensing electrode chain, which is arranged parallel to each other on the base substrate, each of the at least one sensing electrode chain includes a plurality of sensing electrodes which are connected in series;

wherein, the driving electrodes and/or the sensing electrodes are made of a metal conductor, and a light transmissive region is provided in each of the driving electrodes and/or the sensing electrodes made of metal conductor; and the at least one driving electrode chain and the at least one sensing electrode chain are arranged to be parallel to the base substrate and to cross each other, and are electrically isolated from each other.

Preferably, the metal conductor forming the driving electrodes and/or the sensing electrodes includes aluminum, copper, molybdenum, or an aluminum-molybdenum alloy.

Preferably, each of the plurality of light transmissive regions includes a plurality of openings provided in the metal conductor, and the plurality of openings are distributed in a mesh.

Preferably, a shape of each of the plurality of openings includes a rectangle, a bar, or a bar with unfilled corners.

Preferably, an interval between two adjacent openings of the plurality of openings ranges from 2 µm to 5 µm, a transmittance of each of the electrodes made of the metal conductor among the driving electrodes and the sensing electrodes is 80%-90%.

Preferably, the driving electrodes and the sensing electrodes are arranged in a single layer, a driving electrode connecting line used for connecting two adjacent ones of the driving electrodes and a sensing electrode connecting line used for connecting two adjacent ones of the sensing electrodes are arranged in different layers, and an insulating layer is provided between the driving electrode connecting line and the sensing electrode connecting line; or the driving electrodes and the sensing electrodes are arranged in different layers, a driving electrode connecting line used for connecting two adjacent ones of the driving electrodes and the driving electrodes are arranged in a single layer, a sensing electrode connecting line used for connecting two adjacent ones of the sensing electrodes and the sensing electrodes are arranged in a single layer, and an insulating layer is provided between the driving electrodes and the sensing electrodes.

Preferably, wherein, the touch substrate includes a touch region and a non-touch region, the touch substrate further includes a black matrix which is arranged in a mesh within the touch region, and orthogonal projections of the black matrix and a region of the metal conductor other than the light transmissive regions on the base substrate overlap each other.

Preferably, the touch substrate further includes a touch driving circuit and a touch sensing circuit, the touch driving circuit is electrically connected to the at least one driving electrode chain, and the touch sensing circuit is electrically connected to the at least one sensing electrode chain.

The present invention further provides a touch screen including the touch substrate as described above.

Preferably, the touch screen further includes a protection film or a protection substrate, the protection film or the protection substrate is aligned and assembled with the touch substrate to provide encapsulation protection to the touch substrate.

The present invention further provides a display device, which includes a display screen and the touch screen as described above. The touch screen is arranged outside or inside the display screen, and used for touching and controlling the display screen.

The present invention further provides a method for manufacturing the touch substrate as described above, including the following steps:

forming a pattern including a black matrix on the base substrate, wherein the black matrix is arranged in a mesh within a touch region of the touch substrate, and orthogonal projections of the black matrix and a region of the metal conductor other than the light transmissive regions on the base substrate overlap each other;

forming a pattern including the at least one driving electrode chain and a pattern including a first connecting line on the base substrate on which the step of forming a pattern including a black matrix is finished, wherein the first connecting line and the at least one driving electrode chain are formed with a same material by a single patterning process;

forming a pattern including an insulating layer on the base substrate on which the step of forming a pattern including the at least one driving electrode chain and a pattern including a first connecting line is finished;

forming a pattern including the at least one sensing electrode chain and a pattern including a second connecting line on the base substrate on which the step of forming a pattern including an insulating layer is finished, wherein the second connecting line and the at least one sensing electrode chain are formed with a same material by a single patterning process; and electrically connecting a touch driving circuit and a touch sensing circuit which are arranged in a non-touch region of the touch substrate to the at least one driving electrode chain and the at least one sensing electrode chain through the first connecting line and the second connecting line, respectively.

Preferably, in the step of forming a pattern including the at least one driving electrode chain and a pattern including a first connecting line and the step of forming a pattern including the at least one sensing electrode chain and a pattern including a second connecting line, the at least one driving electrode chain and the at least one sensing electrode chain are formed by using the metal conductor.

Preferably, in the step of forming a pattern including the at least one driving electrode chain and a pattern including a first connecting line and the step of forming a pattern including the at least one sensing electrode chain and a pattern including a second connecting line, the at least one driving electrode chain is formed by using the metal conductor, whereas the at least one sensing electrode chain is formed by using a transparent metal oxide.

Preferably, in the step of forming a pattern including the at least one driving electrode chain and a pattern including a first connecting line and the step of forming a pattern including the at least one sensing electrode chain and a pattern including a second connecting line, the at least one sensing electrode chain is formed by using the metal conductor, whereas the at least one driving electrode chain is formed by using a transparent metal oxide.

Preferably, the metal conductor includes aluminum, copper, molybdenum, or an aluminum-molybdenum alloy.

The present invention further provides a method for manufacturing the touch substrate as described above, including the following steps:

forming a pattern including a black matrix on the base substrate, wherein the black matrix is arranged in a mesh within a touch region of the touch substrate, and orthogonal projections of the black matrix and a region of the metal conductor other than the light transmissive regions on the base substrate overlap each other;

forming a pattern including a sensing electrode connecting line by a single patterning process on the base substrate on which the step of forming a pattern including a black matrix is finished;

forming a pattern including an insulating layer and vias in the insulating layer by a single patterning process on the base substrate on which the step of forming a pattern including a sensing electrode connecting line is finished, wherein, two adjacent sensing electrodes are electrically connected to two ends of the sensing electrode connecting line through the vias, respectively;

forming a pattern including the driving electrodes, a driving electrode connecting line, and the at least one sensing electrode chain by a single patterning process on the base substrate on which the step of forming a pattern including an insulating layer and vias in the insulating layer is finished, wherein, by a single patterning process, a first connecting line and a second connecting line are formed with same material as the driving electrodes and the sensing electrodes which are formed in a single layer; and electrically connecting a touch driving circuit and a touch sensing circuit which are arranged in a non-touch region of the touch substrate to the at least one driving electrode chain and the at least one sensing electrode chain through the first connecting line and the second connecting line, respectively.

Preferably, the metal conductor includes aluminum, copper, molybdenum, or an aluminum-molybdenum alloy.

The advantageous technical effects of the present invention are as follows. In the touch substrate and the method for manufacturing the same according to the present invention, by forming the driving electrodes and/or the sensing electrodes with a metal conductor, and providing the light transmissive regions in each of the driving electrodes and/or the sensing electrodes made of the metal conductor, not only the touch substrate can be touched and controlled normally and can transmit light normally, but also surface resistance of each of the driving electrodes and/or the sensing electrodes in the touch substrate is decreased greatly. Thus, the power consumption and production cost of the touch substrate is further decreased. In addition, as compared to an indium tin oxide transparent conductor, a metal conductor can be acquired more easily and with lower cost, thus, the production cost of the touch substrate is also decreased by using the metal conductor. The light transmissive regions enable the touch screen to transmit light normally while being touched and controlled, that is, a transmittance of the touch substrate is substantially not affected. Thus, a display screen including the touch substrate can display normally. By employing the above touch substrate, the touch screen according to the present invention can be touched and controlled normally while transmitting light normally, so that the display screen including the touch screen can display normally. By employing the above touch screen, the display device according to the present invention can display normally while being touched and controlled normally.

DESCRIPTION OF REFERENCE SIGNS

1—base substrate; 2—driving electrode chain; 21—driving electrode; 3—sensing electrode chain; 31—sensing electrode; 4—opening; 5—insulating layer; 6—black matrix; 7—touch driving circuit; 71—first connecting line; 8—touch sensing circuit; 82—second connecting line.

DETAILED DESCRIPTION OF THE EMBODIMENTS

For better understanding the technical solutions of the present invention by a person skilled in the art, a touch substrate, a method for manufacturing the same, a touch screen, and a display device according to the present invention will be further described in detail with reference to the drawings and the following embodiments.

Embodiment 1

Figure 1:
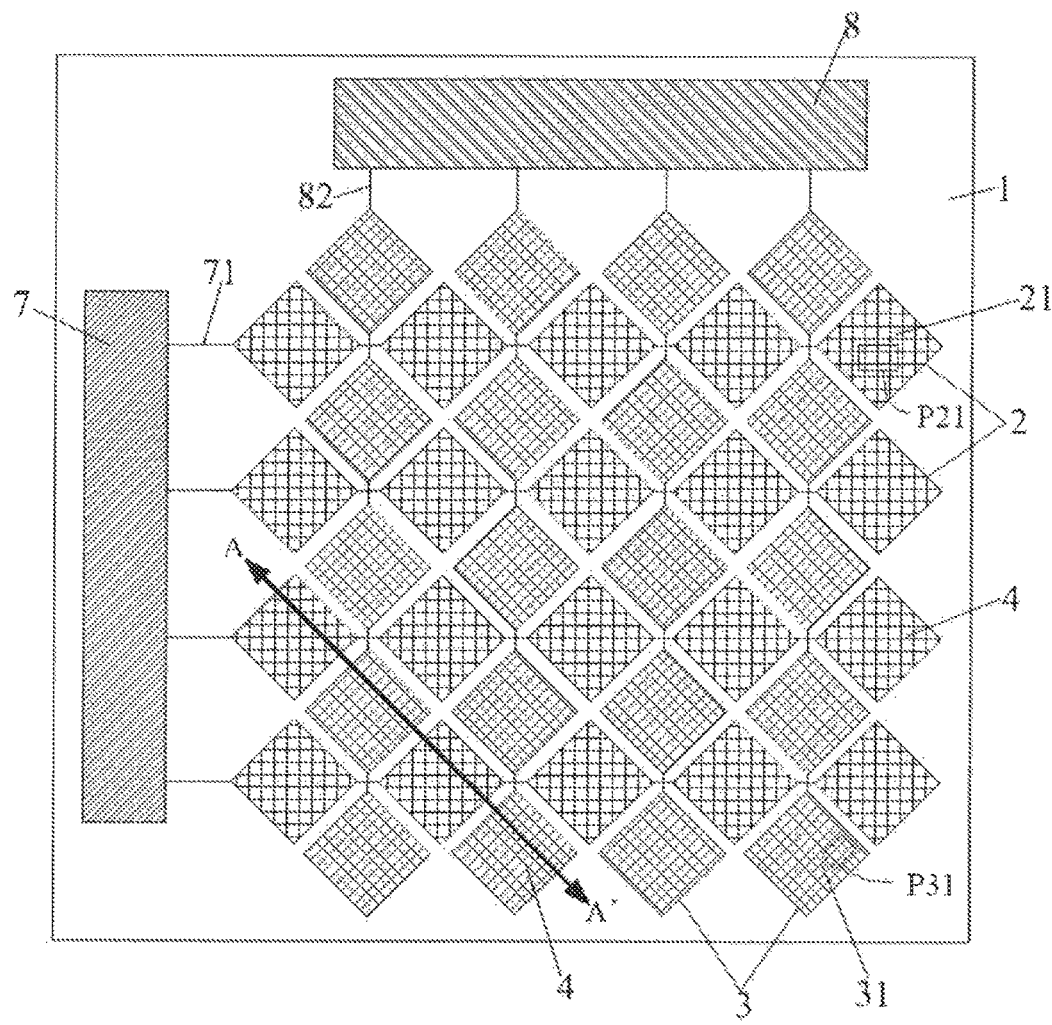
FIG. 1 is a schematic diagram showing a structure of a touch substrate according to Embodiment 1 of the present invention.

The present embodiment provides a touch substrate, as shown in FIG. 1. The touch substrate includes a base substrate 1 and at least one driving electrode chain 2 and at least one sensing electrode chain 3 each of which is arranged parallel to each other on the base substrate 1. Each driving electrode chain 2 includes a plurality of driving electrodes 21 which are connected in series, and each sensing electrode chain 3 includes a plurality of sensing electrodes 31 which are connected in series. The driving electrodes 21 and the sensing electrodes 31 are made of a metal conductor, and a plurality of light transmissive regions are provided in each of the driving electrodes 21 and the sensing electrodes 31 made of the metal conductor.

In the present embodiment, each of the plurality of light transmissive regions includes a plurality of openings 4 uniformly provided in the metal conductor, and the plurality of openings are distributed in a mesh. Such an arrangement enables that the touch substrate can transmit light normally while being touched and controlled, that is, a transmittance of the touch substrate is substantially not affected. Thus, a display screen including the touch substrate can display normally.

Wherein, a shape of each of the plurality of openings 4 includes a plurality shapes, such as a rectangle, a bar, a bar with unfilled corners, or the like. The present embodiment is described by taking the openings 4 of rectangle as an example. An interval between two adjacent openings 4 of the plurality of openings ranges from 2 μm to 5 μm, that is, a width of the metal conductor between two adjacent openings 4 of the plurality of openings ranges from 2 μm to 5 μm. Such an arrangement facilitates light passing through the openings 4 uniformly. A transmittance of each of the driving electrodes 21 and the sensing electrodes 31 which are made of the metal conductor is 80%-90%. This transmittance can be achieved by adjusting a disposing density of the openings 4 in the metal conductor and the width of the metal conductor between two adjacent openings 4. For example, if the openings 4 are disposed with larger density or each of the openings 4 has a larger area, and the width of the metal conductor between two adjacent openings 4 is smaller, each of the driving electrodes 21 and the sensing electrodes 31 has a larger transmittance.

It should be noted that, a shape of each of the openings 4 may be a bar with unfilled corners. The bar with unfilled corners means a shape of a pixel, wherein, the "unfilled corners" mean the regions where thin film transistors are located. Being restricted by manufacturing conditions, a size of each of the openings 4 is generally small, so as to be equivalent to a size of a sub-pixel. Since a region where a thin film transistor is located is not a light transmissive region, a region, which corresponds to a thin film transistor, of the metal conductor forming the driving electrodes 21 and the sensing electrodes 31 is generally not provided with the openings 4.

In the present embodiment, the metal conductor includes pure metal conductors, such as aluminum, copper, molybdenum, an aluminum-molybdenum alloy, or the like. As compared to an indium tin oxide transparent conductor, the pure metal conductors enables the driving electrodes 21 and the sensing electrodes 31 to play the roles of driving and sensing normally, resulting in that the touch substrate can be touched and controlled normally. Further, surface resistance of each of the driving electrodes 21 and the sensing electrodes 31 is decreased greatly, thus the power consumption of the touch substrate is decreased. In addition, as compared to the indium tin oxide transparent conductor, the pure metal conductors are not so rare, thus, the pure metal conductors can reduce the production cost greatly.

Wherein, the driving electrode chains 2 and the sensing electrode chain 3 are arranged to cross each other, and are electrically isolated from each other. A shape of each of the driving electrodes 21 includes a rhombus, and two adjacent driving electrodes 21 are electrically connected to each other through two opposite vertexes thereof. A shape of each of the sensing electrodes 31 includes a rhombus, and two adjacent sensing electrodes 31 are electrically connected to each other through two opposite vertexes thereof.

Figure 2:
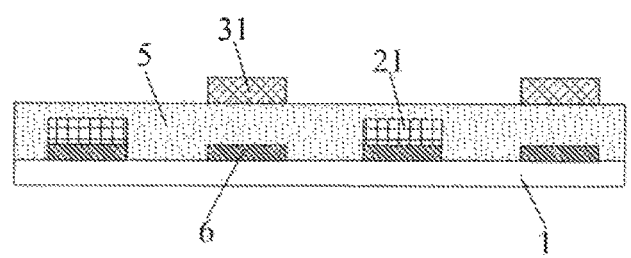
FIG. 2 is a sectional view of the touch substrate taken along a line AA' as shown in FIG. 1.

As shown in FIG. 2, the driving electrodes 21 and the sensing electrodes 31 are arranged in different layers. A driving electrode connecting line used for connecting two adjacent ones of the driving electrodes 21 and the driving electrodes 21 are arranged in a single layer, and a sensing electrode connecting line used for connecting two adjacent ones of the sensing electrodes 31 and the sensing electrodes 31 are arranged in a single layer. The driving electrodes 21 and the sensing electrodes 31 are provided an insulating layer 5 therebetween, and the insulating layer 5 is made of silicon nitride.

Figure 3:
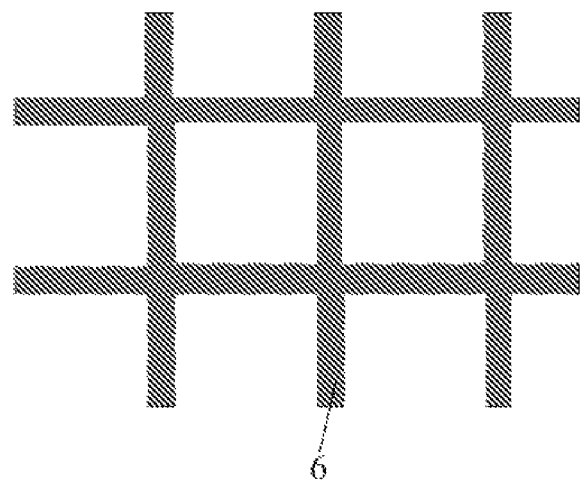
FIG. 3 is a schematic diagram showing a structure of a black matrix in Embodiment 1 of the present invention.
Figure 5:
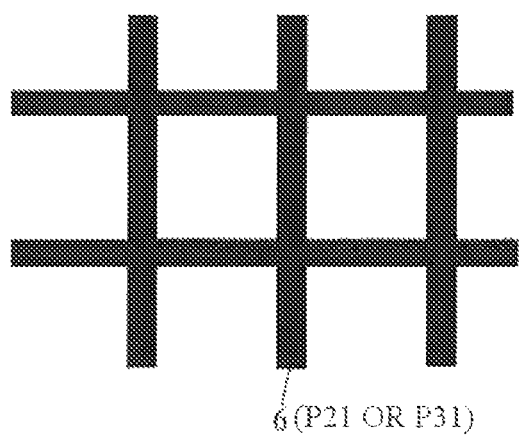
FIG. 5 is a schematic diagram showing that orthogonal projections of the black matrix shown in FIG. 3 and a region of the metal conductor of a portion of each driving electrode (or a portion of each sensing electrode) other than the light transmissive regions (i.e., the openings), as shown in FIG. 1, on a base substrate completely overlap each other.

In the present embodiment, the touch substrate includes a touch region and a non-touch region. Wherein, the touch region is the whole region corresponding to regions where the driving electrode chains 2 and the sensing electrode chain 3 are arranged, and the non-touch region is a region of the touch substrate other than the touch region. The touch substrate further includes a black matrix 6. As shown in FIG. 3, the black matrix 6 is arranged in a mesh within the touch region. As shown in FIG. 2, compared to the driving electrode chains 2 or the sensing electrode chain 3, the black matrix 6 is closer to the base substrate 1, and orthogonal projections of the black matrix 6 and a region of the metal conductor other than the openings 4 on the base substrate 1 overlap each other. Wherein, the black matrix 6 and the region (i.e., grid lines of the metal conductor) of the metal conductor other than the openings 4 completely overlap each other, that is, the black matrix 6 completely blocks the region of the metal conductor other than the openings 4. FIG. 5 schematically shows orthogonal projections of the black matrix 6 shown in FIG. 3 and a region of the metal conductor of a portion P21 of each driving electrode 21 (or a portion P31 of each sensing electrode 31) other than the light transmissive regions (i.e., the opening 4), as shown in FIG. 1, on the base substrate completely overlap each other. Thus, the region (i.e., the grid lines of the metal conductor) of the metal conductor other than the openings 4 will not be viewed by a person, that is, a person will not see metal grid lines on the touch substrate when viewing the touch substrate. Therefore, the metal grid lines can be prevented from interfering the displayed screen in human's visual range.

As shown in FIG. 1, the touch substrate further includes a touch driving circuit 7 and a touch sensing circuit 8 which are provided in the non-touch region. The touch driving circuit 7 is electrically connected to the driving electrode chains 2, and the touch sensing circuit 8 is electrically connected to the sensing electrode chains 3. Wherein, the touch driving circuit 7 is electrically connected to the driving electrode chains 2 through the first connecting lines 71, and the touch sensing circuit 8 is electrically connected to the sensing electrode chains 3 through the second connecting lines 82. The touch driving circuit 7 is used for providing a touch driving signal to the driving electrode chains 2, and the touch sensing circuit 8 is used for detecting a change in mutual capacitance between the driving electrodes 21 and the sensing electrodes 31 so as to determine whether a touch occurs and to determine a touch position.

Based on the configuration of the touch substrate as described above, basic steps for manufacturing the touch substrate are as follows.

A first step is forming a pattern including the black matrix 6, i.e., forming the pattern including the black matrix 6 on the base substrate 1 by a single patterning process.

In the present step, a black matrix film is coated on the base substrate 1 firstly; then, the pattern including the black matrix 6 is finally formed through preserving the black matrix film corresponding to the region of the metal conductor other than the openings 4 and removing the black matrix film corresponding to the region of the openings 4 of the metal conductor and a region outside of the metal conductor by an exposure process, a development process, and an etching process.

A second step is forming a pattern including the driving electrode chains 2 and a pattern including the first connecting lines 71, i.e., forming the pattern including the driving electrode chains 2 by a single patterning process on the base substrate 1 on which the first step is finished.

In the present step, a metal conductor film (which is made of a pure metal material such as aluminum, copper, molybdenum, an aluminum-molybdenum alloy, or the like) is formed on the base substrate 1 on which the first step is finished firstly by a sputtering method or an evaporation method. Then, the pattern including the driving electrode chains 2 is finally formed by an exposure process, a development process, and an etching process. The openings of each driving electrode 21 in the driving electrode chains 2 are distributed in a mesh.

It should be noted that, the first connecting lines 71 and the driving electrode chains 2 (including a driving electrode connecting line used for connecting two adjacent driving electrodes) are made of a same material by a single patterning process. That is, in the present step, a pattern including the first connecting lines 71 is also formed.

A third step is forming a pattern including the insulating layer 5, i.e., forming the pattern including the insulating layer 5 by a single patterning process on the base substrate 1 on which the second step is finished.

In the present step, a film of insulating layer (which is made of a material of silicon nitride) is deposited on the base substrate 1 on which the second step is finished firstly by a chemical vapor deposition method, and then, the pattern including the insulating layer 5 is finally formed by an exposure process, a development process, and an etching process.

A fourth step is forming a pattern including the sensing electrode chains 3 and a pattern including the second connecting lines 82, i.e., forming the pattern including the sensing electrode chains 3 by a single patterning process on the base substrate 1 on which the third step is finished.

In the present step, a metal conductor film (which is made of a pure metal material such as aluminum, copper, molybdenum, an aluminum-molybdenum alloy, or the like) is formed on the base substrate 1 on which the third step is finished by a sputtering method or an evaporation method. Then, the pattern including the sensing electrode chains 3 is finally formed by an exposure process, a development process, and an etching process. The openings of each sensing electrode 31 in the sensing electrode chains 3 are distributed in a mesh.

It should be noted that, the second connecting lines 82 and the sensing electrode chains 3 (including a sensing electrode connecting line used for connecting two adjacent sensing electrodes) are made of a same material by a single patterning process. That is, in the present step, a pattern including the second connecting lines 82 is also formed.

After the fourth step is finished, electrically connecting the touch driving circuit 7 and the touch sensing circuit 8 which are arranged in the non-touch region to the driving electrode chains 2 and the sensing electrode chains 3 through the first connecting lines 71 and the second connecting lines 82, respectively. So far, the fabrication of the touch substrate is substantially finished.

Embodiment 2

The present embodiment provides a touch substrate, which differs from that according to Embodiment 1 in that: the driving electrodes are made of the metal conductor, and a plurality of light transmissive regions are provided in each of the driving electrodes made of the metal conductor; whereas the sensing electrodes are made of a transparent metal oxide (e.g., indium tin oxide), and it is not necessary to provide a light transmissive region in each of the sensing electrodes, because the material forming the sensing electrodes is light transmissive.

Accordingly, a black matrix is only correspondingly arranged in the orthogonal projection direction of the driving electrodes, and the black matrix and a region of each of the driving electrodes other than the openings overlap each other in the orthogonal projection direction.

Other structures, materials, and shapes in the touch substrate according to the present embodiment are the same as those in the touch substrate according to Embodiment 1, and description thereof is omitted herein.

Manufacturing steps of the touch substrate according to the present embodiment differ from those of the touch substrate according to Embodiment 1 in that: in the step of forming a pattern including the black matrix (i.e., the first step), the pattern including the black matrix is finally formed through preserving the black matrix film corresponding to the region of each of the driving electrodes other than the openings and removing the black matrix film corresponding to the region of the openings of each of the driving electrodes and a region outside the driving electrodes by an exposure process, a development process, and an etching process.

Further, in the step of forming the sensing electrode chains (i.e., the fourth step), a transparent metal oxide film (which is made of transparent metal oxide, such as indium tin oxide, indium-doped zinc oxide, or the like) is formed on the base substrate on which the third step is finished firstly by a sputtering method or an evaporation method. Then, the pattern including the sensing electrode chains is finally formed by an exposure process, a development process, and an etching process.

Other steps for manufacturing the touch substrate according to the present embodiment are the same as the corresponding steps for manufacturing the touch substrate according to Embodiment 1, and description thereof is omitted herein.

Embodiment 3

The present embodiment provides a touch substrate, which differs from those according to Embodiments 1 and 2 in that: the sensing electrodes are made of the metal conductor, and a plurality of light transmissive regions are provided in each of the sensing electrodes made of the metal conductor; whereas the driving electrodes are made of a transparent metal oxide (e.g., indium tin oxide), and it is not necessary to provide a light transmissive region in each of the driving electrodes, because the material forming the driving electrodes is light transmissive.

Accordingly, a black matrix is only correspondingly arranged in the orthogonal projection direction of the sensing electrodes, and the black matrix and a region of each of the sensing electrodes other than the openings overlap each other in the orthogonal projection direction.

Other structures, materials, and shapes in the touch substrate according to the present embodiment are the same as those in the touch substrate according to Embodiment 1, and description thereof is omitted herein.

Manufacturing steps of the touch substrate according to the present embodiment differ from those of the touch substrate according to Embodiment 1 in that: in the step of forming a pattern including the black matrix (i.e., the first step), the pattern including the black matrix is finally formed through preserving the black matrix film corresponding to the region of each of the sensing electrodes other than the openings and removing the black matrix film corresponding to the region of the openings of each of the sensing electrodes and a region outside of the sensing electrodes by an exposure process, a development process, and an etching process.

Further, in the step of forming the driving electrode chains (i.e., the second step), a transparent metal oxide film (which is made of a material of transparent metal oxide, such as indium tin oxide, indium-doped zinc oxide, or the like) is formed on the base substrate on which the first step is finished firstly by a sputtering method or an evaporation method. Then, the pattern including the driving electrode chains is finally formed by an exposure process, a development process, and an etching process.

Other steps for manufacturing the touch substrate according to the present embodiment are the same as the corresponding steps for manufacturing the touch substrate according to Embodiment 1, and description thereof is omitted herein.

Embodiment 4

Figure 4:
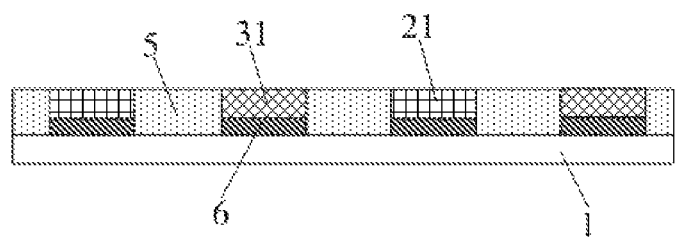
FIG. 4 is a sectional view of a touch substrate according to Embodiment 4 of the present invention taken along the line AA' as shown in FIG. 1.

The present embodiment provides a touch substrate, which differs from those according to Embodiments 1 to 3 in that: as shown in FIG. 4, based on Embodiment 1, the driving electrodes 21 and the sensing electrodes 31 of the touch substrate according to the present embodiment are arranged in a single layer, and the driving electrode connecting line used for connecting two adjacent ones of the driving electrodes 21 and the sensing electrode connecting line used for connecting two adjacent ones of the sensing electrodes 31 are arranged in different layers. Such an arrangement enables a touch screen to be thinner.

Wherein, each of the driving electrodes 21 and each of the sensing electrodes 31 are arranged with an interval therebetween. The driving electrode connecting line used for connecting two adjacent ones of the driving electrodes 21 and the sensing electrodes 31 are arranged in a single layer. The sensing electrode connecting line used for connecting two adjacent ones of the sensing electrodes 31 is correspondingly arranged in the orthogonal projection direction of the driving electrode connecting line and under the driving electrode connecting line. An insulating layer 5 is provided between a layer where the sensing electrode connecting line is located and a layer where the driving electrode connecting line. Two adjacent sensing electrodes 31 are electrically connected to two ends of the sensing electrode connecting line through vias provided in the insulating layer 5, respectively.

Other structures, materials, and shapes in the touch substrate are the same as those in the touch substrate according to Embodiment 1, and description thereof is omitted.

Manufacturing steps of the touch substrate according to the present embodiment differ from those of the touch substrate according to Embodiment 1 in that:

In the second step, forming a pattern including the sensing electrode connecting line by a single patterning process on the base substrate 1 on which the first step is finished.

In the third step, forming a pattern including the insulating layer 5 and the vias in the insulating layer 5 by a single patterning process on the base substrate 1 on which the second step is finished.

In the fourth step, forming a pattern including the driving electrodes 21, the driving electrode connecting line, and the sensing electrodes 31 by a single patterning process on the base substrate 1 on which the third step is finished.

Wherein, two adjacent sensing electrodes 31 are electrically connected to two ends of the sensing electrode connecting line through the vias provided in the insulating layer 5, respectively.

It should be noted that, the first connecting line, the second connecting line, and the driving electrodes 21 and the sensing electrodes 31 which are arranged in a single layer are made of a same material by a single patterning process. That is, in the fourth step, a pattern including the first connecting line and the second connecting line is also formed.

Other steps for manufacturing the touch substrate according to the present embodiment are the same as the corresponding steps for manufacturing the touch substrate according to Embodiment 1, and description thereof is omitted herein.

The advantageous technical effects of Embodiments 1 to 4 are as follows. In the touch substrates according to Embodiments 1 to 4, by forming the driving electrodes and/or the sensing electrodes with a metal conductor, and providing the light transmissive regions in each of the driving electrodes and/or the sensing electrodes made of the metal conductor, not only the touch substrate can be touched and controlled normally and can transmit light normally, but also surface resistance of each of the driving electrodes and/or the sensing electrodes in the touch substrate is decreased greatly. Thus, the power consumption and production cost of the touch substrate is further decreased. In addition, as compared to an indium tin oxide transparent conductor, a metal conductor can be acquired more easily and with lower cost, thus, the production cost of the touch substrate is also decreased by using the metal conductor. The light transmissive regions enable the touch screen to transmit light normally while being touched and controlled, that is, a transmittance of the touch substrate is substantially not affected. Thus, a display screen including the touch substrate can display normally.

It should be noted that, in the touch substrate and the method for manufacturing the same according to any one of Embodiments 1 to 4 as described above, the first connecting line 71 and the driving electrode connecting line used for connecting two adjacent ones of the driving electrodes are formed of a same layer of metal, and they transmit a same signal. The first connecting line 71 and the driving electrode connecting line differ from each other only in that: the first connecting line 71 is located outside of the touch region, thus can be a solid line without considering the problem of light transmission; whereas the driving electrode connecting line is located inside of the touch region, thus be formed as a netlike line (i.e., a hollowed-out line) so as to let light pass through. Similarly, in the touch substrate and the method for manufacturing the same according to any one of Embodiments 1 to 4 as described above, the second connecting line 82 and the sensing electrode connecting line used for connecting two adjacent ones of the sensing electrodes are formed of a same layer of metal, and they transmit a same signal. The second connecting line 82 differs from the sensing electrode connecting line only in that: the second connecting line 82 is located outside the touch region, thus can be a solid line without considering the problem of light transmission; whereas the sensing electrode connecting line is located inside the touch region, thus be formed as a netlike line (i.e., a hollowed-out line) so as to let light pass through.

Embodiment 5

The present embodiment provides a touch screen including the touch substrate according to any one of Embodiments 1 to 4.

In the present embodiment, the touch screen further includes a protection film or a protection substrate. The protection film or the protection substrate is aligned and assembled with the touch substrate to provide encapsulation protection to the touch substrate.

It should be noted that, the touch screen may also be consisted of the touch substrate, and in this case the touch screen is a one glass solution (OGS) capacitive touch screen. The one glass solution capacitive touch screen has become the mainstream touch screen in the market at present due to its advantages of simple manufacturing process, smaller thickness, multi-touch, low production cost, and the like.

The advantageous technical effects of Embodiment 5 are as follows. By employing the above touch substrate, the touch screen according to Embodiment 5 can not only be touched and controlled normally but also transmit light normally, so that the display screen including the touch screen can display normally.

Embodiment 6

The present embodiment provides a display device, which includes a display screen, and further includes the touch screen according to Embodiment 5. The touch screen is arranged outside of the display screen, for example, a plug-in (out-cell) touch screen. Alternatively, the touch screen is arranged inside of the display screen, for example, a touch screen in which a touch sensor is on a liquid crystal panel (on-cell touch screen, i.e., wherein the touch screen is arranged between a color-filter substrate and a polarizer of the display screen), or a touch screen in which a touch sensor is inside a liquid crystal panel (in-cell touch screen, i.e., wherein the function of the touch panel is embedded into a liquid crystal pixel, and the touch screen is used for touching and controlling the display screen).

The display device may be any product or component having a display function, such as a liquid crystal panel, electronic paper, an OLED panel, a mobile phone, a tablet computer, a television set, a display, a laptop computer, a digital photo frame, a navigator, and the like.

Since the above touch screen is employed, the display device can not only display normally but also be touched and controlled normally.

The advantageous technical effects of the present invention are as follows. In the touch substrate according to the present invention, by forming the driving electrodes and/or the sensing electrodes with a metal conductor, and providing the light transmissive regions in each of the driving electrodes and/or the sensing electrodes made of the metal conductor, not only the touch substrate can be touched and controlled normally and can transmit light normally, but also surface resistance of each of the driving electrodes and/or the sensing electrodes in the touch substrate is decreased greatly. Thus, the power consumption and production cost of the touch substrate is further decreased. In addition, as compared to an indium tin oxide transparent conductor, a metal conductor can be acquired more easily and with lower cost, thus, the production cost of the touch substrate is also decreased by using the metal conductor. The light transmissive regions enable the touch screen to transmit light normally while being touched and controlled, that is, a transmittance of the touch substrate is substantially not affected. Thus, a display screen including the touch substrate can display normally. By employing the above touch substrate, the touch screen according to the present invention can be touched and controlled normally while transmitting light normally, so that the display screen including the touch screen can display normally. By employing the above touch screen, the display device according to the present invention can display normally while being touched and controlled normally.

It should be understood that, the above embodiments are only exemplary embodiments for the purpose of explaining the principle of the present invention, and the present invention is not limited thereto. For a person having ordinary skill in the art, various improvements and modifications may be applied to the present invention without departing from the spirit and essence of the present invention. These improvements and modifications also fall within the protection scope of the present invention.

What is claimed is:

1. A touch substrate, including
a base substrate;
at least one driving electrode chain, which is arranged parallel to each other on the base substrate, each of the at least one driving electrode chain includes a plurality of driving electrodes which are connected in series, each of the plurality of driving electrodes has a rhombus shape, and any two adjacent of the plurality of driving electrodes are electrically connected to each other through two opposite vertexes thereof via a single driving electrode connecting line;
at least one sensing electrode chain, which is arranged parallel to each other on the base substrate, each of the at least one sensing electrode chain includes a plurality of sensing electrodes which are connected in series, each of the plurality of sensing electrodes has a rhombus shape, and any two adjacent of the plurality of sensing electrodes are electrically connected to each other through two opposite vertexes thereof via a single sensing electrode connecting line;
wherein, the driving electrodes and/or the sensing electrodes are made of a metal conductor, and a light transmissive region is provided in each of the driving electrodes and/or the sensing electrodes made of metal conductor;
the at least one driving electrode chain and the at least one sensing electrode chain are arranged to be parallel to the base substrate and to cross each other, and are electrically isolated from each other; and
each of the driving electrode connecting line and the sensing electrode connecting line is a hollowed-out single line;
wherein each of the plurality of light transmissive regions includes a plurality of openings provided in the metal conductor, and the plurality of openings are distributed in a mesh;
wherein a shape of each of the plurality of openings includes a rectangle, a bar, or a bar with unfilled corners;
wherein an interval between two adjacent openings of the plurality of openings rages from 2 µm to 5 µm, a transmittance of each of the electrodes made of the metal conductor among the driving electrodes and the sensing electrodes is 80%-90%; and
wherein the touch substrate includes a touch region and a non-touch region, the touch substrate further includes a black matrix which is arranged in a mesh within the touch region, and orthogonal projections of the black matrix and a region of the metal conductor other than the light transmissive regions on the base substrate completely overlap each other.

2. The touch substrate according to claim 1, wherein, the metal conductor forming the driving electrodes and/or the sensing electrodes includes aluminum, copper, molybdenum, or an aluminum-molybdenum alloy.

3. The touch substrate according to claim 1, wherein, the touch substrate further includes a touch driving circuit and a touch sensing circuit, the touch driving circuit is electrically connected to the at least one driving electrode chain, and the touch sensing circuit is electrically connected to the at least one sensing electrode chain.

4. A method for manufacturing the touch substrate according to claim 1, including the following steps:
forming a pattern including a black matrix on the base substrate, wherein, the black matrix is arranged in a mesh within a touch region of the touch substrate, and orthogonal projections of the black matrix and a region of the metal conductor other than the light transmissive regions on the base substrate completely overlap each other;

forming a pattern including a sensing electrode connecting line by a single patterning process on the base substrate on which the step of forming a pattern including a black matrix is finished;

forming a pattern including an insulating layer and vias in the insulating layer by a single patterning process on the base substrate on which the step of forming a pattern including a sensing electrode connecting line is finished, wherein, two adjacent sensing electrodes are electrically connected to two ends of the sensing electrode connecting line through the vias, respectively;

forming a pattern including the driving electrodes, a driving electrode connecting line, and the at least one sensing electrode chain by a single patterning process on the base substrate on which the step of forming a pattern including an insulating layer and vias in the insulating layer is finished, wherein, by a single patterning process, a first connecting line and a second connecting line are formed with same material as the driving electrodes and the sensing electrodes which are formed in a single layer; and electrically connecting a touch driving circuit and a touch sensing circuit which are arranged in a non-touch region of the touch substrate to the at least one driving electrode chain and the at least one sensing electrode chain through the first connecting line and the second connecting line, respectively.

5. The method according to claim 4, wherein, the metal conductor includes aluminum, copper, molybdenum, or an aluminum-molybdenum alloy.

6. A touch substrate, including
a base substrate;
at lease one driving electrode chain, which is arranged parallel to each other on the base substrate, each of the at least one driving electrode chain includes a plurality of driving electrodes which are connected in series, each of the plurality of driving electrodes has a rhombus shape, and any two adjacent of the plurality of driving electrodes are electrically connected to each other through two opposite vertexes thereof via a single driving electrode connecting line;

at least one sensing electrode chain, which is arranged parallel to each other on the base substrate, each of the at least one sensing electrode chain includes a plurality of sensing electrodes which are connected in series, each of the plurality of sensing electrodes has a rhombus shape, and any two adjacent of the plurality of sensing electrodes are electrically connected to each other through two opposite vertexes thereof via a single sensing electrode connecting line;

wherein, the driving electrodes and/or the sensing electrodes are made of a metal conductor, and a light transmissive region is provided in each of the driving electrodes and/or the sensing electrodes made of metal conductor;

the at least one driving electrode chain and the at least one sensing electrode chain are arranged to be parallel to the base substrate and to cross each other, and are electrically isolated from each other; and each of the driving electrode connecting line and the sensing electrode connecting line is a hollowed-out single line, wherein the driving electrodes and the sensing electrodes are arranged in a single layer, a driving electrode connecting line used for connecting two adjacent ones of the driving electrodes and a sensing electrode connecting line used for connecting two adjacent ones of the sensing electrodes are arranged in different layers, and an insulating layer is provided between the driving electrode connecting line and the sensing electrode connecting line; or, the driving electrodes and the sensing electrodes are arranged in different layer, a driving electrode connecting line used for connecting two adjacent ones of the driving electrodes and the driving electrodes are arranged in a single layer, a sensing electrode connecting line used for connecting two adjacent ones of the sensing electrodes and the sensing electrodes are arranged in a single layer, and an insulating layer is provided between the driving electrodes and the sensing electrodes; and wherein, the touch substrate includes a touch region and a non-touch region, the touch substrate further includes a black matrix which is arranged in a mesh within the touch region, and orthogonal projections of the black matrix and a region of the metal conductor other than the light transmissive regions on the base substrate completely overlap each other.

7. The touch substrate according to claim 6, wherein, the touch substrate further includes a touch driving circuit and a touch sensing circuit, the touch driving circuit is electrically connected to the at least one driving electrode chain, and the touch sensing circuit is electrically connected to the at least one sensing electrode chain.

8. A method for manufacturing the touch substrate according to claim 1, including the following steps:
forming a pattern including a black matrix on the base substrate, wherein, the black matrix is arranged in a mesh within a touch region of the touch substrate, and orthogonal projections of the black matrix and a region of the metal conductor other than the light transmissive regions on the base substrate completely overlap each other;

forming a pattern including the at least one driving electrode chain and a pattern including a first connecting line on the base substrate on which the step of forming a pattern including a black matrix is finished, wherein the first connecting line and the at least one driving electrode chain are formed with a same material by a single patterning process;

forming a pattern including an insulating layer on the base substrate on which the step of forming a pattern including the at least one driving electrode chain and a pattern including a first connecting line is finished;

forming a pattern including the at least one sensing electrode chain and a pattern including a second connecting line on the base substrate on which the step of forming a pattern including an insulating layer is finished, wherein the second connecting line and the at least one sensing electrode chain are formed with a same material by a single patterning process; and electrically connecting a touch driving circuit and a touch sensing circuit which are arranged in a non-touch region of the touch substrate to the at least one driving electrode chain and the at least one sensing electrode chain through the first connecting line and the second connecting line, respectively.

9. The method according to claim 8, wherein, in the step of forming a pattern including the at least one driving electrode chain and a pattern including a first connecting line and the step of forming a pattern including the at least one sensing electrode chain and a pattern including a second connecting line, the at least one driving electrode chain and the at least one sensing electrode chain are formed by using the metal conductor.

10. The method according to claim 9, wherein, the metal conductor includes aluminum, copper, molybdenum, or an aluminum-molybdenum alloy.

11. The method according to claim 8, wherein, in the step of forming a pattern including the at least one driving electrode chain and a pattern including a first connecting line and the step of forming a pattern including the at least one sensing electrode chain and a pattern including a second connecting line, the at least one driving electrode chain is formed by using the metal conductor, whereas the at least one sensing electrode chain is formed by using a transparent metal oxide.

12. The method according to claim 11, wherein, the metal conductor includes aluminum, copper, molybdenum, or an aluminum-molybdenum alloy.

13. The method according to claim 8, wherein, in the step of forming a pattern including the at least one driving electrode chain and a pattern including a first connecting line and the step of forming a pattern including the at least one sensing electrode chain and a pattern including a second connecting line, the at least one sensing electrode chain is formed by using the metal conductor, whereas the at least one driving electrode chain is formed by using a transparent metal oxide.

14. The method according to claim 13, wherein, the metal conductor includes aluminum, copper, molybdenum, or an aluminum-molybdenum alloy.

15. The method according to claim 8, wherein, the metal conductor includes aluminum, copper, molybdenum, or an aluminum-molybdenum alloy.

\* \* \* \* \*